United States Patent
Fukusada

(10) Patent No.: US 11,875,069 B2
(45) Date of Patent: *Jan. 16, 2024

(54) IMAGE FORMING APPARATUS PERFORMING PRINTING PERMISSION PROCESS TO PERMIT PRINTING

(71) Applicant: BROTHER KOGYO KABUSHIKI KAISHA, Nagoya (JP)

(72) Inventor: Yuki Fukusada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,253

(22) Filed: Jan. 20, 2023

(65) Prior Publication Data

US 2023/0153042 A1 May 18, 2023

Related U.S. Application Data

(63) Continuation of application No. 17/213,504, filed on Mar. 26, 2021, now Pat. No. 11,561,745.

(30) Foreign Application Priority Data

Mar. 31, 2020 (JP) .................................. 2020-063625

(51) Int. Cl.
*G06F 3/12* (2006.01)
(52) U.S. Cl.
CPC .......... *G06F 3/1219* (2013.01); *G06F 3/1204* (2013.01); *G06F 3/1239* (2013.01)
(58) Field of Classification Search
None
See application file for complete search history.

(56) References Cited

U.S. PATENT DOCUMENTS

| 2004/0207865 A1 | 10/2004 | Wachter et al. |
| 2006/0095280 A1 | 5/2006 | Gooding |

(Continued)

FOREIGN PATENT DOCUMENTS

| JP | 2012-187724 A | 10/2012 |
| JP | 2016-21245 A | 2/2016 |

(Continued)

OTHER PUBLICATIONS

International Search Report and Written Opinion issued in corresponding International Patent Application No. PCT/JP2021/012737, dated Jun. 8, 2021.

(Continued)

*Primary Examiner* — Fan Zhang
(74) *Attorney, Agent, or Firm* — Merchant & Gould P.C.

(57) ABSTRACT

An image forming apparatus includes a main memory, and a controller. The main memory stores mode information indicating whether the image forming apparatus is set to a contract mode, an upper limit to which printing can be performed during a prescribed period, and an actual print sheet number actually printed during the prescribed period. The controller performs a printing permission process in a case that mode information indicates the contract mode and the actual print sheet number is less than the upper limit when the controller receives a print job even in a case that a sum of a specific print sheet number specified in advance in the print job and the actual print sheet number is greater than the upper limit. The printing permission process permits printing for the specific sheet number as a permission print sheet number.

9 Claims, 5 Drawing Sheets

(56) References Cited

U.S. PATENT DOCUMENTS

| | | |
|---|---|---|
| 2014/0081815 A1 | 3/2014 | Miller |
| 2014/0355029 A1 | 12/2014 | Mccoog |
| 2016/0011554 A1 | 1/2016 | Shipman et al. |
| 2016/0231686 A1 | 8/2016 | Itoh |
| 2018/0076952 A1 | 3/2018 | Kono et al. |
| 2018/0086091 A1 | 3/2018 | Jeran |

FOREIGN PATENT DOCUMENTS

| | | |
|---|---|---|
| JP | 2018-43409 A | 3/2018 |
| WO | 2014/175336 A1 | 10/2014 |
| WO | 2016/158393 A1 | 10/2016 |

OTHER PUBLICATIONS

Office Action issued in corresponding Japanese Patent Application No. 2020-063625, dated Oct. 17, 2023.

IMAGE FORMING APPARATUS PERFORMING PRINTING PERMISSION PROCESS TO PERMIT PRINTING

REFERENCE TO RELATED APPLICATIONS

This application is a continuation of U.S. patent application Ser. No. 17/213,504, filed Mar. 26, 2021, now U.S. Pat. No. 11,561,745, which claims priority from Japanese Patent Application No. 2020-063625 filed Mar. 31, 2020. The entire contents of the aforementioned applications are incorporated herein by reference.

BACKGROUND ART

Technical Field

The present disclosure relates to an image forming apparatus.

Background

A printing apparatus known in the art includes a processor, a first module, and a second module. The first module and the second module are electrically connected to the processor. The first module receives credit data from a computer system via a first communication channel. The credit data includes a print sheet number that is stipulated by a contract, and etc. The second module receives print job data via a second communication channel. A printing system known in the art performs a printing process based on determination as to whether a contract regarding the print sheet number and etc. is made.

DESCRIPTION

Summary

When a print job is received, the above-described printing apparatus and the printing system determine whether the sum of the print sheet number printed so far and the print sheet number to be printed specified by the print job is greater than an upper limit of the print sheet number during a prescribed period of time stipulated by the contract. As a result, in a case that the sum is determined to be greater than the upper limit, the printing apparatus and the printing system cannot perform the printing process based on the print job unless the prescribed period of time elapses or payment is executed. Accordingly, there is a possibility that the printing operation by the user is halted.

It is an object of the present disclosure to provide an image forming apparatus capable of performing a printing process based on a print job even in a case that the sum of the print sheet number printed until the print job is received and the print sheet number to be printed specified by the print job is greater than the upper limit.

In order to attain the above and other objects, the disclosure provides an image forming apparatus. The image forming apparatus includes a main memory, and a controller. The main memory storing: mode information indicating whether the image forming apparatus is set to a contract mode; upper limit information which is set according to the contract mode, the upper limit information indicating an upper limit to which printing can be performed during a prescribed period of time; and actual print sheet number information indicating an actual print sheet number actually printed during the prescribed period of time. The controller is configured to perform a printing permission process in a case that the mode information indicates the contract mode and the actual print sheet number is less than the upper limit when the controller receives a print job even in a case that a sum of a specific print sheet number specified in advance in the print job and the actual print sheet number is greater than the upper limit. The printing permission process permits printing for the specific sheet number as a permission print sheet number.

According to another aspect, the disclosure provides a printing permission method executed by an image forming apparatus. The image forming apparatus includes a main memory storing: mode information indicating whether the image forming apparatus is set to a contract mode; upper limit information which is set according to the contract mode, the upper limit information indicating an upper limit to which printing can be performed during a prescribed period of time; and actual print sheet number information indicating an actual print sheet number actually printed during the prescribed period of time. The printing permission method includes a printing permission process in a case that the mode information indicates the contract mode and the actual print sheet number is less than the upper limit when a print job is received, the printing permission process permitting printing for the specific sheet number as a permission print sheet number even in a case that a sum of a specific print sheet number specified in advance in the print job and the actual print sheet number is greater than the upper limit.

BRIEF DESCRIPTION OF THE DRAWINGS

The particular features and advantages of the disclosure as well as other objects will become apparent from the following description taken in connection with the accompanying drawings, in which.

DETAILED DESCRIPTION

An embodiment of the present disclosure will be described while referring to FIGS. 1-5. In the embodiment, a laser printer is described as an example of an image forming apparatus. However, the image forming apparatus 1 may be any printer different from the laser printer. For example, the image forming apparatus 1 may be an inkjet printer.

Figure 1:
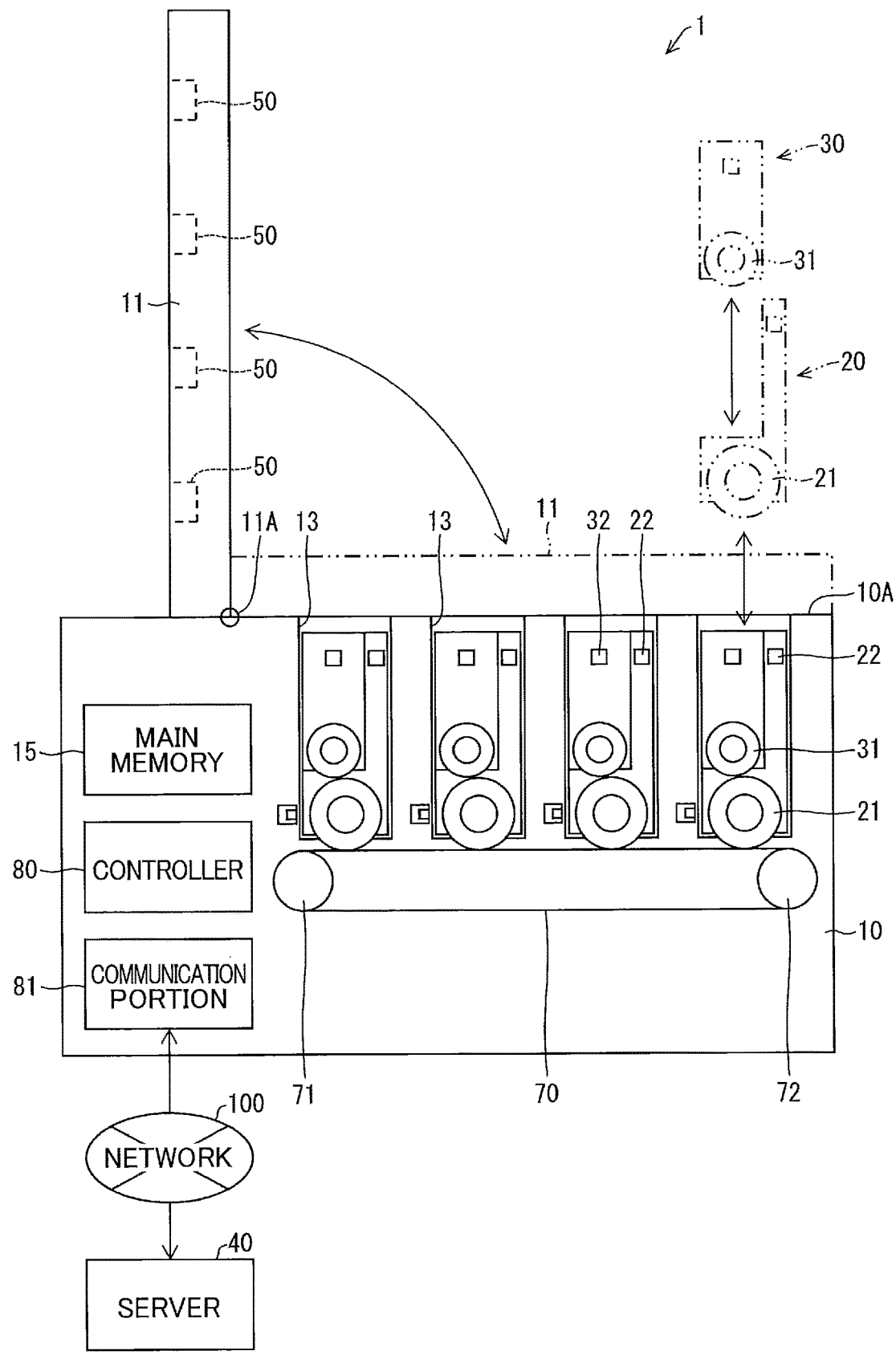
FIG. 1 is a schematic diagram illustrating an image forming apparatus according to an embodiment of the present disclosure.
Figure 2:
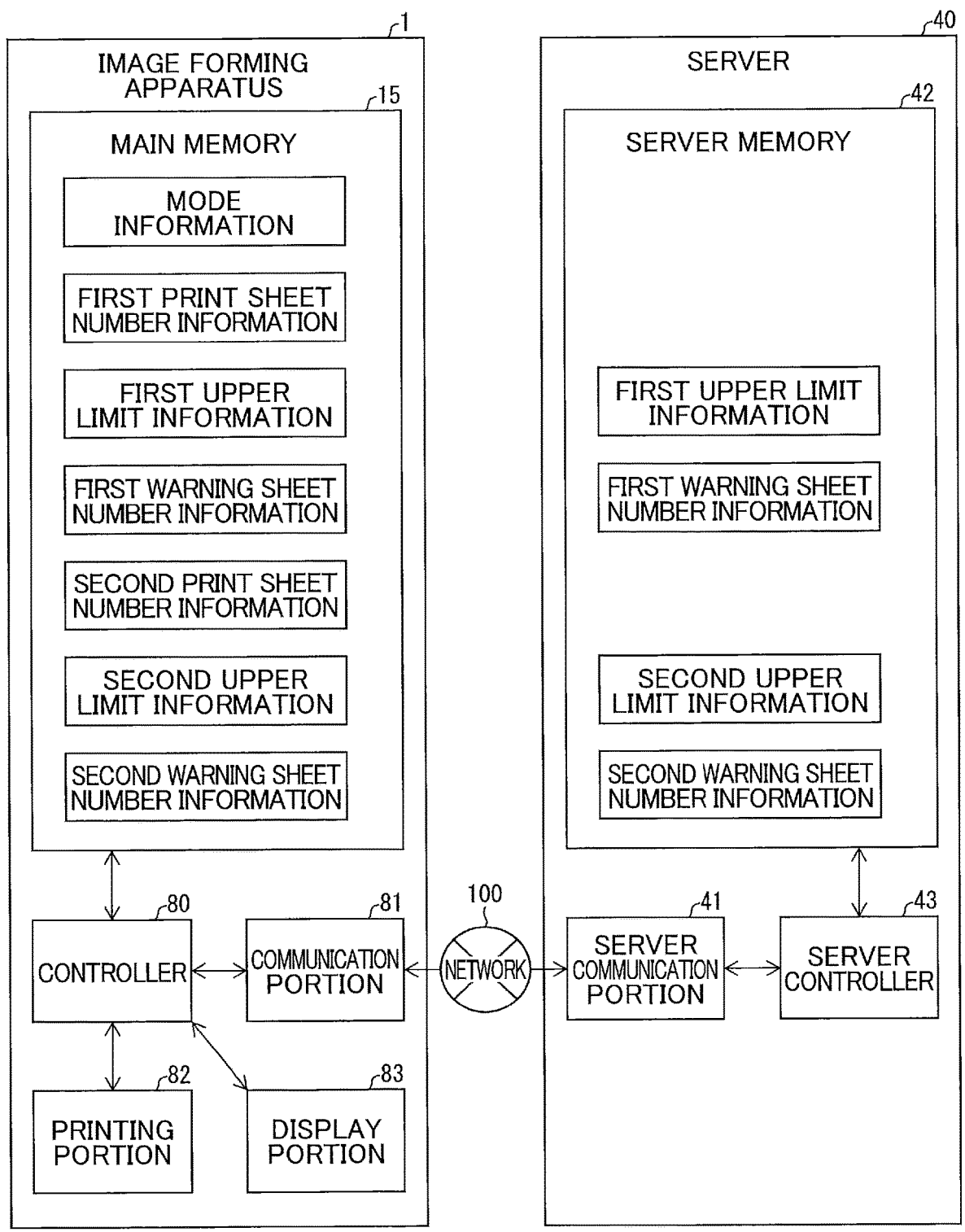
FIG. 2 is a diagram illustrating internal structures of the image forming apparatus and a server, and a connection relation of components thereof.

FIG. 1 is a schematic diagram of the image forming apparatus 1. FIG. 1 shows a server 40 that communicates with the image forming apparatus 1. The server 40 is an example of a management apparatus. FIG. 2 is a diagram illustrating internal structures of the image forming apparatus 1 and the server 40, and a connection relation of components thereof

Basic Configuration of Image Forming Apparatus

The image forming apparatus 1 is an electrophotographic printer. For example, the image forming apparatus 1 may be an LED printer.

As illustrated in FIGS. 1 and 2, the image forming apparatus 1 includes a main casing 10, a cover 11, a transfer belt 70, and a controller 80. Four drum cartridges 20 as examples of cartridges and four toner cartridges 30 as examples of cartridges are attached to the image forming apparatus 1.

In the present embodiment, it is necessary that the four drum cartridges 20 and the four toner cartridges 30 are attached to the image forming apparatus 1 to perform image formation. However, the number of drum cartridges 20 and the number of toner cartridges 30 that are attached to the image forming apparatus may not be limited thereto.

The image forming apparatus 1 includes a light source unit 50 corresponding to each drum cartridge 20. That is, the image forming apparatus 1 includes four light source unit 50. In a case that a toner cartridge 30 is attached to the corresponding drum cartridge 20, the toner cartridge 30 is combined with the corresponding drum cartridge 20. In a state that a toner cartridge 30 is attached to the corresponding drum cartridge 20, the toner cartridge 30 together with the corresponding drum cartridge 20 is attached to the main casing 10.

The main casing 10 is formed in a substantially rectangular box shape, for example. The four drum cartridges 20, the four toner cartridges 30, the transfer belt 70, and the controller 80 are accommodated in the main casing 10. The main casing 10 includes four cartridge holders 13. Each cartridge holder 13 is formed with a recessed shape and has an opening. By the drum cartridges 20 and the toner cartridges 30 being held by the respective cartridge holders 13, the drum cartridges 20 and the toner cartridges 30 are attached to the main casing 10.

A display portion 83 (see FIG. 2) and an input portion may be provided at an outer surface of the main casing 10. The display portion 83 includes a liquid-crystal display and a lamp. The input portion includes a button. The liquid-crystal display may be integrally formed with a touch panel to function as the input portion.

The cover 11 opens and closes an opening 10A formed in an upper end of the main casing 10. As illustrated in FIG. 1, the cover 11 is pivotally movable (or movable) about a pivot axis 11A between an open position indicated by a solid line where the opening 10A is opened and a close position indicated by a two-dot chain line where the opening 10A is closed. The pivot axis 11A extends in a first direction. The "first direction" refers to a direction in which a rotation center axis (developing axis) of a developing roller 31 in the toner cartridge 30 extends. In a case that the cover 11 is at the open position, the opening of each cartridge holder 13 is opened. In a case that the cover 11 is at the close position, the opening of each cartridge holder 13 is covered by the cover 11.

The opening 10A includes a closing sensor (not shown). The closing sensor can detect that the cover 11 is at the close position. The closing sensor may be a contact-type sensor or an optical-type sensor, for example.

Each drum cartridges 20 includes a cartridge casing. Each cartridge casing is attachable to the main casing 10 and includes a photosensitive drum 21 as a component used for image formation. Each photosensitive drum 21 is a replaceable component and need to be replaced when a surface of the photosensitive drum 21 deteriorate due to wear with use. Each photosensitive drum 21 is a cylindrical photosensitive body extending in the first direction and rotatable about a drum axis extending in the first direction. An outer circumferential surface of each photosensitive drum 21 is coated with a photosensitive material.

Each toner cartridge 30 includes a developing roller 31 and a cartridge casing. Each cartridge casing can accommodate a developer such as toner, and is attachable to the main casing 10. The developer is an example of a printing material. Each toner cartridge 30 accommodates developer of one of different colors (e.g., cyan, magenta, yellow, and black) as material used for image formation. The developer is a consumable that runs out with use. Each developing roller 31 is a cylindrical member extending in the first direction and rotatable about the developing axis extending in the first direction. In a case that the toner cartridge 30 is attached to the corresponding drum cartridge 20, an outer circumferential surface of the developing roller 31 contacts the outer circumferential surface of the corresponding photosensitive drum 21.

Each light source unit 50 is attached to an inner surface of the cover 11. In a state that each drum cartridge 20 is attached to the main casing 10 and the cover 11 is positioned at the close position, the corresponding light source unit 50 is arranged to face the surface of the photosensitive drum 21. Each light source unit 50 includes a plurality of light sources arranged in the first direction. Each light source can irradiate the outer circumferential surface of the corresponding photosensitive drum 21 with light. Each light source is an LED (Light Emitting Diodes), for example.

Each light source unit 50 is electrically connected to the controller 80. The controller 80 causes the light sources of each light source unit 50 to emit light based on image data received. Accordingly, the light sources irradiate the outer circumferential surface of the corresponding photosensitive drum 21 with light. As a result, the photosensitive material on the outer circumferential surface of each photosensitive drum 21 is exposed to light based on the image data.

The transfer belt 70 is a component that transfers the developer (e.g., toner) on the outer circumferential surface of each photosensitive drum 21 to a printing sheet. The transfer belt 70 is a replaceable component and needs to be replaced because surfaces of the transfer belt 70 deteriorate due to wear with use. The transfer belt 71 can contact each photosensitive drum 21 and is a ring-shaped (endless) belt. An outer circumferential surface of the transfer belt 70 can contact the outer circumferential surface of each photosensitive drum 21. When printing, a printing sheet is transferred between the transfer belt 70 and each photosensitive drum 21.

The transfer belt 70 is stretched between a drive roller 71 and a driven roller 72. The drive roller 71 drives the transfer belt 70. The controller 80 causes the drive roller 71 to rotate. The driven roller 72 rotates by following moving of the transfer belt 70 driven by the drive roller 71.

A communication portion 81 enables communication between the image forming apparatus 1 and the server 40 via a network 100. The communication portion 81 outputs information received from the server 40 to the controller 80.

A printing portion 82 prints an image on a printing sheet under control of the controller 80. For example, the printing portion 82 includes the drum cartridges 20, the toner cartridges 30, the transfer belt 70, and the light source units 50.

The display portion 83 displays various types of information under control of the controller 80.

Controller and Main Memory

The controller 80 includes an application-specific integrated circuit (ASIC), for example. The controller 80 is electrically connected to a main memory 15, the communication portion 81, and the printing portion 82, which are provided in the main casing 10. The controller 80 causes the image forming apparatus 1 to perform a printing process and etc. by executing various processes.

The controller 80 may include a processor such as a central processing unit (CPU). In this case, a control program for executing a printing permission method may be stored in the main memory 15. The controller 80 may cause the image forming apparatus 1 to execute the printing process and etc. by the processor operating according to the control program.

The controller 80 may also include a computer-readable storage medium storing the control program. As the storage medium, the controller 80 may use a "non-transitory tangible medium" such as a read-only memory (ROM), a tape, a disk, a card, a semiconductor memory, or a programmable logic circuit. The controller 80 may also include a random-access memory (RAM) to expand the control program therein. The control program may be supplied to the computer via any transmission medium (e.g., a communication network or a broadcast wave) capable of transmitting the control program. An aspect of the present disclosure may be implemented in the form of a data signal embedded in a carrier wave by which the control program is embodied according to electrical transmission.

The main memory 15 is a readable and writable memory. The main memory 15 is a flash ROM or an electronically erasable and programmable read-only memory (EEPROM) (registered trademark), for example. The main memory 15 stores mode information, first print sheet number information, first upper limit information, first warning sheet number information, second print sheet number information, second upper limit information, and second warning sheet number information. Among the seven pieces of information described above, the first upper limit information, the first warning sheet number information, the second upper limit information, and the second warning sheet number information are set according to a contract mode. In a case that the user enters into or renews a contract, the server 40 transmits at least the first upper limit information, the first warning sheet number information, the second upper limit information, and the second warning sheet number information to the image forming apparatus 1.

The mode information indicates whether the image forming apparatus 1 is in the contract mode or a normal mode different from the contract mode. The contract mode is a mode in which at least the first upper limit information is stored in the main memory 15 in accordance with the contract that the user makes. The normal mode is a mode in which the first upper limit information is not stored in the main memory 15, the controller 80 permits printing up to specified print sheet number without limitation as long as the developer remains in the toner cartridge 30. The specified print sheet number indicates a print sheet number specified by the user through a print job.

The first print sheet number information and the second sheet number information are examples of actual print sheet number information. The first print sheet number information indicates an actual print sheet number actually printed during a prescribed period of time (also referred to as a first print sheet number). The second print sheet number information indicates an actual print sheet number actually printed during the prescribed period of time in a case that the communication portion 81 is not connected to the network 100 (also referred to as a second print sheet number). The prescribed period of time is a contract period of time stipulated by the contract.

The first upper limit information is an example of upper limit information. The first upper limit information indicates an upper limit sheet number printable in the prescribed period of time (also referred to as first upper limit). The second upper limit information indicates an upper limit sheet number printable in the prescribed period of time in a case that the communication portion 81 is not connected to the network 100 (also referred to as second upper limit). Each of the first upper limit and the second upper limit is set according to the contract mode.

The first warning sheet number information is an example of warning sheet number information and indicates a first warning sheet number less than the first upper limit. The first warning sheet number is set to warn the user that the first print sheet number is close to the first upper limit. The second warning sheet number information indicates a second warning sheet number less than the second upper limit in a case that the communication portion 81 is not connected to the network 100. The second warning sheet number is set to warn the user that the second print sheet number is close to the second upper limit. Each of the first warning sheet number and the second warning sheet number is set according to the contract mode.

In a case that the user enters into or renews the contract, the server 40 transmits the first upper limit information, the second upper limit information, the first warning sheet number information, and the second warning sheet number information. In a case that the image forming apparatus 1 receives the first upper limit information, the second upper limit information, the first warning sheet number information, and the second warning sheet number information, the image forming apparatus 1 stores the first upper limit information, the second upper limit information, the first warning sheet number information, and the second warning sheet number information in the main memory 15.

Server

The server 40 is a management apparatus managing an operation status of the image forming apparatus 1. The server 40 includes a server communication portion 41, a server memory 42, and a server controller 43. The server communication portion 41 enables communication between the server 40 and the image forming apparatus 1. The server communication portion 41 transmits contract information received from the server controller 43 to the image forming apparatus 1.

The server controller 43 includes a CPU generally controlling the server 40. In a case that the contract is renewed, the server controller 43 outputs the contract information to the communication portion 81.

The server memory 42 is a readable and writable memory. For example, the server memory 42 stores the contract information. The contract information includes the first upper limit information, the first warning sheet number information, the second upper limit information, and the second warning sheet number information. These pieces of information are set in accordance with the contract with the user.

Online Determination Process

Figure 3:
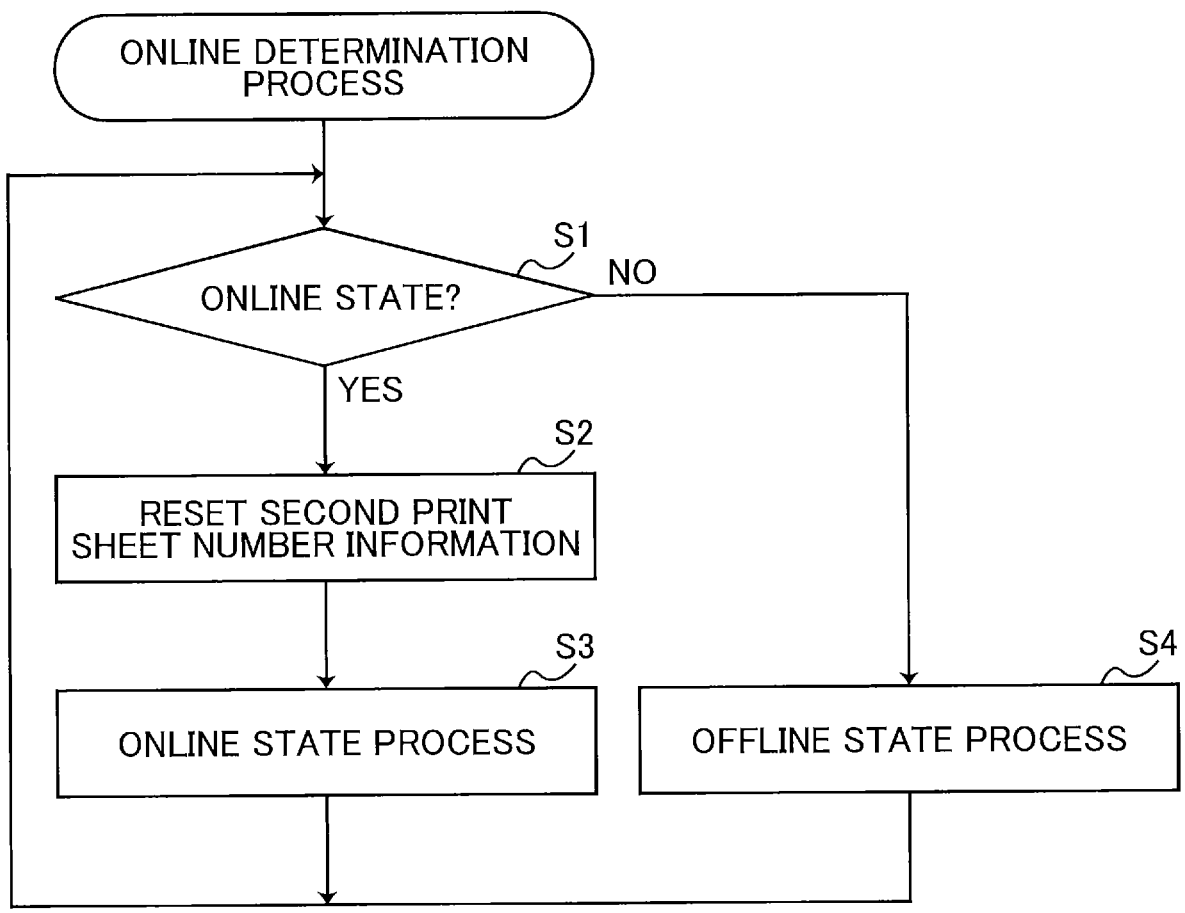
FIG. 3 is a flowchart illustrating a procedure of an online determination process performed by a controller in the image forming apparatus.

An online determination process performed by the image forming apparatus 1 will be described. FIG. 3 is a flowchart illustrating a procedure of the online determination process executed by the controller 80 of the image forming apparatus 1. The online determination process is executed in a case that the image forming apparatus 1 is in the contract mode.

Prior to the online determination process, the controller 80 determines whether the image forming apparatus 1 is in the contract mode or the normal mode. The controller 80 also determines whether the cartridges attached to the image forming apparatus 1 are drum cartridges 20 and toner cartridges 30 that are not sold in market and provided in accordance with the contract or drum cartridges 20 and toner cartridges 30 that are sold in market. The drum cartridges 20 and the toner cartridges 30 that are not sold in market and provided in accordance with the contract will be referred to as contract cartridges. The drum cartridges 20 and the toner cartridges 30 that are sold in market will be referred to as normal cartridges.

Each drum cartridge 20 includes a drum memory (not shown). The drum memory stores type information indicating whether the drum cartridge 20 is a contract cartridge or a normal cartridge. Each toner cartridge 30 includes a toner memory (not shown). The toner memory stores type information indicating whether the toner cartridge 30 is a contract cartridge or a normal cartridge.

In the present embodiment, the four drum cartridges 20 and the four toner cartridges 30 are held in the respective cartridge holders 13. In a case that the drum cartridge 20 and the toner cartridge 30 are held in the corresponding cartridge holder 13, the controller 80 receives the type information from the drum cartridge 20 and the toner cartridge 30. In a case that all the received type information received from the four drum cartridges 20 and the four toner cartridges 30 indicates the contract cartridges, the controller 80 determines that the contract cartridges are attached to the image forming apparatus 1.

In a case that the controller 80 determines that the image forming apparatus 1 is in the contract mode and that at least one of the contract cartridges is attached to the image forming apparatus 1, the controller 80 starts the online determination process of FIG. 3.

In S1 the controller 80 performs a first determination process to determine whether the image forming apparatus 1 is in an online state. The online state indicates a state that the communication portion 81 of the image forming apparatus 1 is communicably connected to the server communication portion 41 of the server 4 via the network 100. The offline state indicates a state that the communication portion 81 is not communicably connected to the server communication portion 41.

In a case that the controller 80 determines that the image forming apparatus 1 is in the online state (YES in S1), in S2 the controller 80 performs a first reset process to reset the second print sheet number information stored in the main memory 15. By resetting the second print sheet number information, the controller 80 can count the second print sheet number from 0 in a case that the image forming apparatus 1 becomes the offline state. In S3, the controller 80 starts an online state process described later. On the other hand, in a case that the controller 80 determines that the image forming apparatus 1 is not in the online state (NO in S1), in S4 the controller 80 starts an offline state process.

Online State Process

Figure 4:
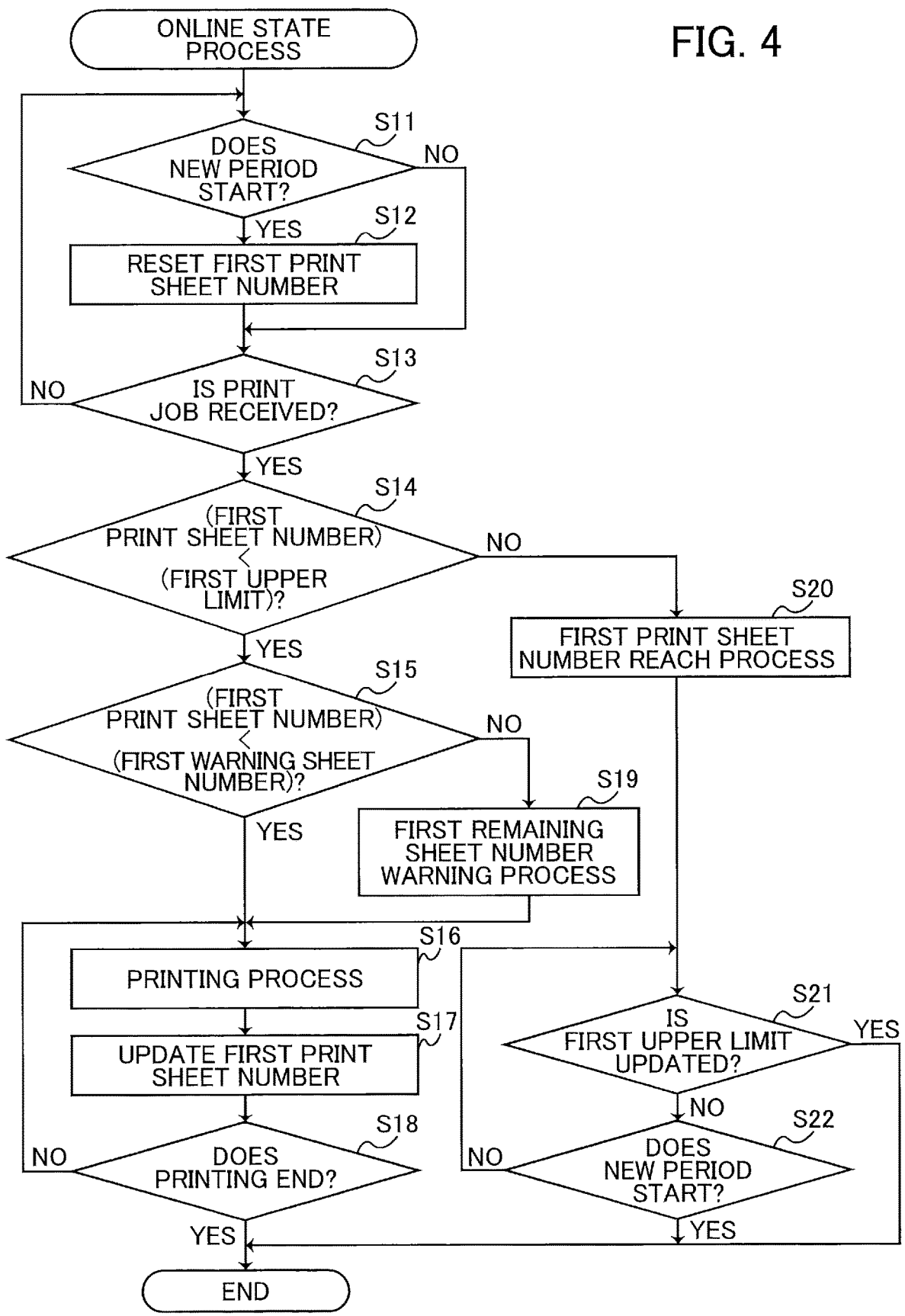
FIG. 4 is a flowchart illustrating a procedure of an online state process performed by the controller in the image forming apparatus.

The online state process as the step of S3 in the online determination process will be described. FIG. 4 is a flowchart illustrating a procedure of the online state process executed by the controller 80 of the image forming apparatus. This online state process is an example of the printing permission method.

Prior to the online state process shown in FIG. 4, the controller 80 performs the online determination process shown in FIG. 3. Specifically, in a case that the controller 80 determines that the image forming apparatus 1 is in the contract mode and determines that at least one of cartridges attached to the image forming apparatus 1 are the contract cartridges, the controller 80 starts the online determination process shown in FIG. 3. In a case that in the online determination process the controller 80 determines that the image forming apparatus 1 is in the online state, the controller 80 performs the online state process.

As shown in FIG. 4, in S11, the controller 80 performs a second determination process to determine whether a new period of time starts. The start of the new period of time indicates that the prescribed period of time set in the contract expired and the next prescribed period of time starts.

In a case that the controller 80 determines that a new period of time starts (YES in S11), in S12 the controller 80 performs a second reset process to reset the first print sheet number information stored in the main memory 15. In S13 the controller 80 performs a third determination process to determine whether the image forming apparatus 1 newly receives a print job.

In a case that the controller 80 determines that the image forming apparatus 1 receives the print job (YES in S13), in S14 the controller 80 performs a fourth determination process to determine whether the first print sheet number is less than the first upper limit. Specifically, the controller 80 makes this determination by comparing the first print sheet number indicated by the first print sheet number information stored in the main memory 15 with the first upper limit indicated by the first upper limit information stored in the main memory 15.

In a case that the controller 80 determines that the first print sheet number is less than the first upper limit (YES in S14), in S15 the controller 80 performs a fifth determination process to determine whether the first print sheet number is less than the first warning sheet number. Specifically, the controller 80 makes this determination by comparing the first print sheet number indicated by the first print sheet number information stored in the main memory 15 with the first warning sheet number indicated by the first warning sheet number information stored in the main memory 15.

In a case that the controller 80 determines that the first print sheet number is less than the first warning sheet number (YES in S15), the controller 80 performs a printing permission process to permit printing for the specified print sheet number specified by the print job. Specifically, the controller 80 transmits a permission signal to the printing portion 82 to permit printing for a permission print sheet number. In a case that the printing portion 82 receives the permission signal from the controller 80, in S16 the printing portion 82 performs a printing process to perform printing based on the print job. Here, the permission print sheet number indicates the specified print sheet number specified in the print job which is determined to be received in S13 in a case that the first print sheet number is determined to be less than the first upper limit in S14.

In this manner, in a case that the controller 80 determines that the first print sheet number is less than the first upper limit, the controller 80 permits printing. Therefore, even in a case that the sum of the specified print sheet number and the first print sheet number is greater than the first upper limit, the printing portion 82 can perform printing.

In S17 the controller 80 performs a first update process to update the first print sheet number information stored in the main memory 15. Specifically, the controller 80 updates the first print sheet number by adding the print sheet number which is actually printed, out of the permission print sheet number permitted in the printing permission process, to the first print sheet number before the printing is permitted in the printing permission process. By performing the first update process, the controller 80 can update the first print sheet number information stored in the main memory 15 to indicate a new first print sheet number after the printing process is performed by the printing portion 82.

After the first print sheet number information is updated in S17, in S18 the controller 80 performs a sixth determination process to determine whether the printing portion 82 ends printing for the permission print sheet number. In a case that the controller 80 determines that the printing portion 82 ends printing for the permission print sheet number (YES in S18), the controller 80 ends the online state process. Accordingly, in a case that the controller 80 determines that the printing portion 82 ends printing after the processes of S16-S17 are performed, the first print sheet number is updated to a number obtained by adding the print sheet number which is actually printed to the first print sheet number before the printing is permitted in the printing permission process.

In a case that the controller 80 determines that the new period of time does not start (NO in S11), the controller 80 skips S12 and proceeds to S13. By proceeding to the process of S13, the controller 80 does not reset the first print sheet number information during the prescribed period of time, and thus can add a print sheet number actually printed during the prescribed period of time to the first print sheet number. In a case that the controller 80 determines that the image forming apparatus 1 does not receive the new print job (NO in S13), the controller 80 returns to S11.

In a case that the controller 80 determines that the first print sheet number is not less than the first upper limit (NO in S14), the controller 80 determines that the first print sheet number reaches the first upper limit, and in S20 performs a first print sheet number reach process. Specifically, the controller 80 performs, as the first print sheet number reach process, a first notification process to prompt the user to update the content of the contract in the contract mode. For example, the controller 80 displays on the display portion 83 information indicating that printing can start based on the print job by increasing the first upper limit in the contract mode.

In S21 the controller 80 performs a seventh determination process to determine whether the first upper limit is updated. In a case that the controller 80 newly receives the first upper limit information from the server 40, the controller 80 determines that the first upper limit is updated. In a case that the controller 80 determines that the first upper limit is updated (YES in S21), the controller 80 ends the online state process. In a case that the controller 80 determines that the first upper limit is not updated (NO in S21), in S22 the controller 80 performs the second determination process to determine whether a new period of time starts. In a case that the controller 80 determines that the new period of time starts (YES in S22), the controller 80 ends the online state process. In a case that the controller 80 determines that the new period of time does not start (NO in S22), the controller 80 returns to S21.

In a case that the controller 80 determines that the first print sheet number is not less than the first warning sheet number (NO in S15), the controller 80 determines that the first print sheet number reaches the first warning sheet number, and in S19 performs a first remaining sheet number warning process. Specifically, the controller 80 performs, as the first remaining sheet number warning process, a second notification process to notify the user that the first print sheet number is about to reach the first upper limit by displaying on the display portion 83 information indicating that the first print sheet number is about to reach the first upper limit. Through the first remaining sheet number warning process, the user can recognize that the first print sheet number is about to reach the first upper limit. Thus, the image forming apparatus 1 can provide a user with an opportunity to consider updating the first upper limit. After the first remaining sheet number warning process, the controller 80 proceeds to step S16. In a case that the controller 80 determines that the printing portion 82 does not end printing for the permission print sheet number (NO in S18), the controller 80 returns to step S16.

Summary of Online State Process

As described above, the controller 80 performs the first determination process, the second determination process, the third determination process, the fourth determination process, and the printing permission process. In a case that the controller 80 is in the contract mode and the first print sheet number is less than the first upper limit when the print job is received, the controller 80 performs the printing permission process even in a case that the sum of the specified print sheet number and the first print sheet number is greater than the first upper limit.

Specifically, in a case that the controller 80 determines that the print job is received, the controller 80 determines whether the first print sheet number is less than the first upper limit. In a case that the first print sheet number is less than the first upper limit, the controller 80 performs the printing permission process. That is, the controller 80 does not perform the printing permission process in a case that the controller 80 determines that the sum described above is less than or equal to the first upper limit, but the controller 80 performs the printing permission process in a case that the controller 80 determines that the first print sheet number is less than the first upper limit. Therefore, as a result of performing the printing permission process in a case that the first print sheet number is determined to be less than the first upper limit, the controller 80 performs the printing permission process even in a case that the sum of the specified print sheet number and the first print sheet number described above is greater than the first upper limit.

According to this configuration, even in a case that the sum described above is greater than the first upper limit when the print job is received, the image forming apparatus 1 can perform the printing process based on the print job without waiting for elapse of the prescribed period of time or payment of a fee.

The controller 80 performs the first determination process, the second determination process, the third determination process, the fourth determination process, the printing permission process, and the first update process. According to this configuration, the image forming apparatus 1 can update the first print sheet number information after the printing permission process is performed in a case that the sum described above is greater than the first upper limit and before the controller 80 receives a print job again.

The controller 80 also performs the first determination process, the second determination process, the third determination process, the fourth determination process, and the first notification process. According to this configuration, in a case that the first print sheet number is greater than or equal to the first upper limit, the image forming apparatus 1 does not perform the printing permission process, but can prompt the user to update the content of the contract by the first notification process. That is, the image forming apparatus 1 can provide the user with an opportunity to enable the image forming apparatus 1 to perform the printing permission process based on the print job.

The controller 80 also performs the first determination process, the second determination process, the third determination process, the fourth determination process, and the fifth determination process. According to this configuration, the image forming apparatus 1 can perform different processes depending on whether the first print sheet number is less than the first warning sheet number.

The controller 80 also performs the first determination process, the second determination process, the third determination process, the fourth determination process, the fifth determination process, and the second notification process. According to this configuration, in a case that the first print sheet number is less than the first warning sheet number, the image forming apparatus 1 can perform the printing permission process. In a case that the first print sheet number is greater than or equal to the first warning sheet number, the image forming apparatus 1 can notify the user that the first print sheet number is about to reach the first upper limit in addition to performing the printing permission process.

In a case that the image forming apparatus 1 is in the contract mode, the image forming apparatus 1 can manage the upper limit of the first print sheet number. In a case that the image forming apparatus 1 is in the normal mode, the image forming apparatus 1 can permit printing up to the specified print sheet number without limitation as long as the developer remains in the toner cartridge 30.

As described above, the controller 80 does not perform the printing permission process in a case that the controller 80 determines that the sum described above is less than or equal to the first upper limit, but the controller 80 performs the printing permission process in a case that the controller 80 determines that the first print sheet number is less than the first upper limit. Therefore, as a result of performing the printing permission process in a case that the first print sheet number is determined to be less than the first upper limit, the controller 80 performs the printing permission process even in a case that the sum described above is greater than the first upper limit. According to the above described printing permission method, the printing process based on the print job can be performed without waiting for the elapse of the prescribed period of time or payment of a fee even in a case that the sum described above is greater than the first upper limit when the print job is received.

Offline State Process

Figure 5:
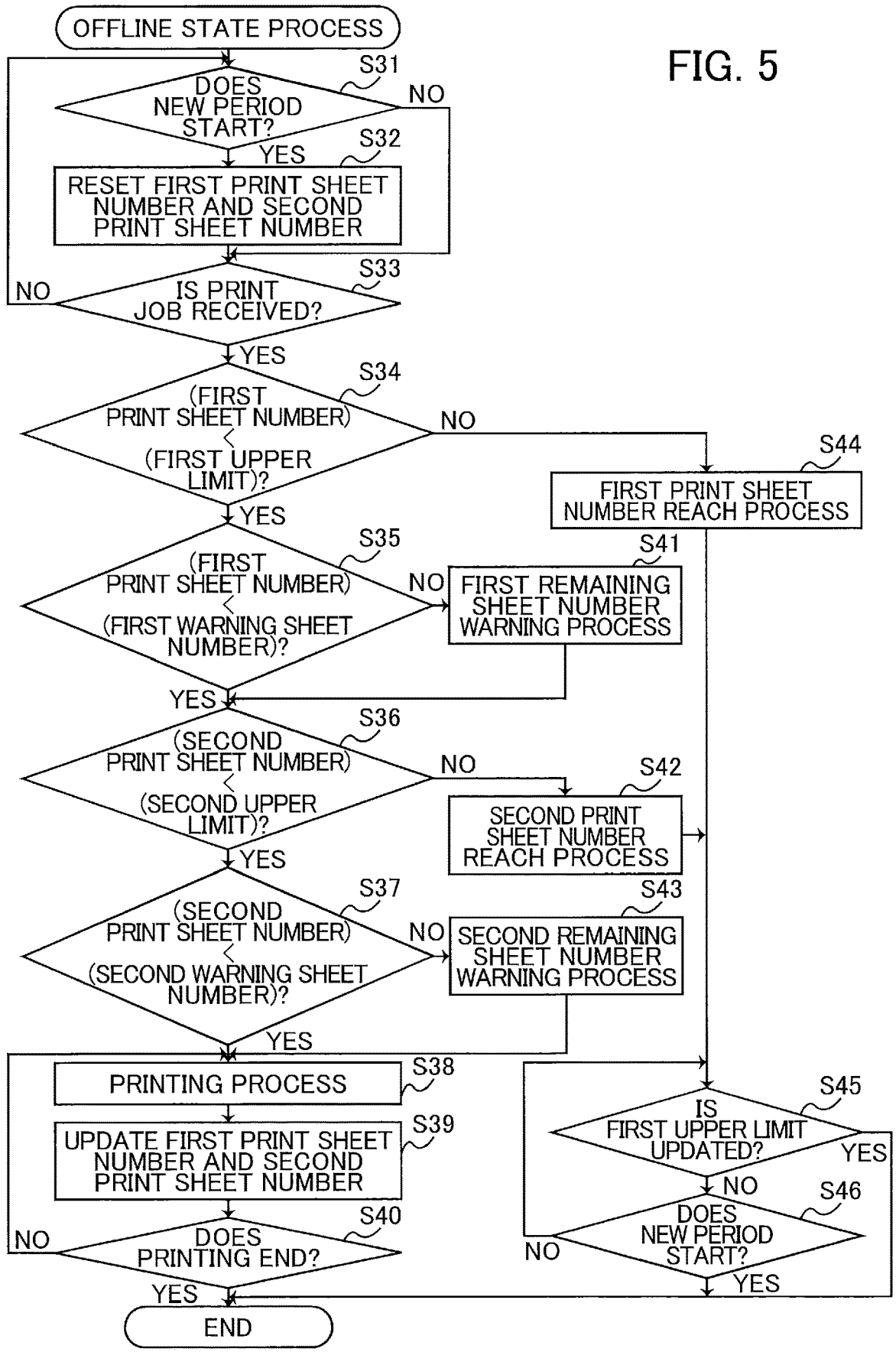
FIG. 5 is a flowchart illustrating a procedure of an offline state process performed by the controller in the image forming apparatus.

Next, the offline state process as the step S4 of the online determination process will be described. FIG. 5 is a flowchart illustrating a procedure of the offline state process executed by the controller 80 of the image forming apparatus 1. This offline state process is an example of the printing permission method.

Before performing the offline state process, the controller 80 performs the online determination process. That is, in a case that the controller 80 determines that the image forming apparatus 1 is in the contract mode and that the cartridges attached to the image forming apparatus 1 are the contract cartridges, the controller 80 starts the online determination process shown in FIG. 3. In a case that the controller 80 determines that the image forming apparatus 1 is in the offline state, the controller 80 performs the offline state process.

As shown in FIG. 5, in S31 the controller 80 performs a ninth determination process to determine whether a new period of time starts.

In a case that the controller 80 determines that the new period of time starts (YES in S31), in S32 the controller 80 performs a third reset process to reset the first print sheet number information and the second print sheet number information. After the process of S32, in S33 the controller 80 performs a tenth determination process to determine whether the image forming apparatus 1 newly receives a print job.

In a case that the controller 80 determines that the image forming apparatus 1 receives the print job (YES in S33), in S34 the controller 80 performs an eleventh determination process to determine whether the first print sheet number is less than the first upper limit. Specifically, the controller 80 makes this determination by comparing the first print sheet number indicated by the first sheet number information stored in the main memory 15 with the first upper limit indicated by the first upper limit information stored in the main memory 15.

In a case that the controller 80 determines that the first print sheet number is less than the first upper limit (YES in S34), in S35 the controller 80 performs a twelfth determination process to determine whether the first print sheet number is less than the first warning sheet number. Specifically, the controller 80 makes this determination by comparing the first print sheet number indicated by the first print sheet number information stored in the main memory 15 with the first warning sheet number indicated by the first warning sheet number information stored in the main memory 15.

In a case that the controller 80 determines that the first print sheet number is less than the first warning sheet number (YES in S35), in S36 the controller 80 performs a thirteenth determination process to determine whether the second print sheet number is less than the second upper limit. Specifically, the controller 80 makes this determination by comparing the second print sheet number indicated by the second print sheet number information stored in the main memory 15 with the second upper limit indicated by the second upper limit information stored in the main memory 15.

In a case that the controller 80 determines that the second print sheet number is less than the second upper limit (YES in S36), in S37 the controller 80 performs a fourteenth determination process to determine whether the second print sheet number is less than the second warning sheet number. Specifically, the controller 80 makes this determination by comparing the second print sheet number indicated by the second print sheet number information stored in the main memory 15 with the second warning sheet number indicated by the second warning sheet number information stored in the main memory 15.

In a case that the controller 80 determines that the second print sheet number is less than the second warning sheet number (YES in S37), the controller 80 performs the printing permission process to permit printing for the permission print sheet number. In S38 the printing portion 82 performs the printing process based on the print job upon receipt of a permission signal from the controller 80.

In this manner, the controller 80 permits printing in a case that the controller 80 determines that the first print sheet number is less than the first upper limit as well as a case that the second print sheet number is less than the second upper limit. Therefore, the printing portion 82 can perform printing even in a case that the sum of the specified print sheet number and the first print sheet number is greater than the first upper limit or even in a case that the sum of the specified print sheet number and the second print sheet number is greater than the second upper limit.

In S39 the controller 80 performs a second update process to update the first print sheet number information and the second print sheet number information. Specifically, the controller 80 updates the first print sheet number by adding a print sheet number which is actually printed, out of the permission print sheet number permitted in the printing permission process, to the first print sheet number before the printing is permitted in the printing permission process. Further, the controller 80 updates the second print sheet number by adding the print sheet number which is actually printed, out of the permission print sheet number permitted in the printing permission process, to the second print sheet number before the printing is permitted in the printing permission process. By performing the second update process, the controller 80 can update the first print sheet number information stored in the main memory 15 to indicate a new first print sheet number after the printing process. Similarly, the controller 80 can update the second print sheet number information stored in the main memory 15 to indicate a new second print sheet number.

In S40 the controller 80 performs a fifteenth determination process to determine whether the printing portion 82 ends printing for the permission print sheet number. In a case that the controller 80 determines that the printing portion 82 ends printing for the permission print sheet number (YES in S40), the controller 80 ends the offline state process. In a case that the controller 80 determines that the printing portion 82 does not end printing for the permission print sheet number (NO in S40), the controller 80 returns to S38. Accordingly, in a case that the controller 80 determines that the printing portion 82 ends printing after the processes of S38-S39 are performed, the first print sheet number is updated to a number obtained by adding the print sheet number which is actually printed to the first print sheet number before the printing is permitted in the printing permission process.

In a case that the controller 80 determines that the new period of time does not start (NO in S31), the controller 80 proceeds to S33. By proceeding to the process of S33, the controller 80 does not reset the first print sheet number information and the second print sheet number information during the prescribed period of time, and thus can add print sheet number actually printed during the prescribed period of time to each of the first print sheet number and the second print sheet number. In a case that the controller 80 determines that the image forming apparatus 1 does not receive the new print job (NO in S33), the controller 80 returns to S31.

In a case that the controller 80 determines that the first print sheet number is not less than the first upper limit (NO in S34), the controller 80 determines that the first print sheet number reaches the first upper limit, and in S44 performs the first print sheet number reach process. Specifically, the controller 80 performs as the first print sheet number reach process a third notification process to prompt the user to update the content of the contract in the contract mode.

After the process of S44, in S45 the controller 80 performs a sixteenth determination process to determine whether the first upper limit is updated. In a case that the controller 80 determines that the first upper limit is updated (YES in S45), the controller 80 ends the offline state process. In a case that the controller 80 determines that the first upper limit is not updated (NO in S45), in S46 the controller 80 performs a seventeenth determination process to determine whether the new period of time starts. In a case that the controller 80 determines that the new period of time starts (YES in S46), the controller 80 ends the offline state process. In a case that the controller 80 determines that the new period of time does not start (NO in S46), the controller 80 returns to S45.

In a case that the controller 80 determines that the first print sheet number is not less than the first warning sheet number (NO in S35), the controller 80 determines that the first print sheet number reaches the first warning sheet number, and in S41 performs the first remaining sheet number warning process. Specifically, the controller 80 performs, as the first remaining sheet number warning process, a fourth notification process to notify the user that the first print sheet number is about to reach the first upper limit by displaying on the display portion 83 information indicating that the first print sheet number is about to reach the first upper limit. After the first remaining sheet number warning process, the controller 80 proceeds to step S36.

In a case that the controller 80 determines that the second print sheet number is not less than the second upper limit (NO in S36), the controller 80 determines that the second print sheet number reaches the second upper limit, and in S42 performs a second print sheet number reach process. Specifically, the controller 80 performs, as the second print sheet number reach process, a fifth notification process to prompt the user to connect the image forming apparatus 1 to the network 100, for example. For example, the controller 80 displays on the display portion 83 information to prompt the user to connect the image forming apparatus 1 to the network 100. According to the second print sheet number reach process, the user can cause the image forming apparatus 1 to shift to the online state process. After the image forming apparatus 1 shifts to the online state process, the controller 80 can permit printing for the specified print sheet number even in a case that the sum of the specified print sheet number in the print job determined to be received in step S33 and the first print sheet number is greater than the first upper limit. After the second print sheet number reach process, the controller 80 proceeds to step S45.

In a case that the controller 80 determines that the second print sheet number is not less than the second warning sheet number (NO in S37), the controller 80 determines that the second print sheet number reaches the second warning sheet number, and in S43 performs a second remaining sheet number warning process. Specifically, the controller 80 performs, as the second remaining sheet number warning process, a sixth notification process to notify the user that the second print sheet number is about to reach the second upper limit by displaying on the display portion 83 information indicating that the second print sheet number is about to reach the second upper limit. Through this notification, the user can recognize that the second print sheet number is about to reach the second upper limit. Thus, the image forming apparatus 1 can provide the user with an opportunity to consider updating the second upper limit. After the second remaining sheet number warning process, the controller 80 proceeds to S38.

Summary of Offline State Process

As described above, the controller 80 performs the first determination process, the eleventh determination process, the thirteenth determination process, and the printing permission process. In a case that the first print sheet number is less than the first upper limit and the second print sheet number is less than the second upper limit when the print job is received in the offline state, the controller 80 performs the printing permission process.

Specifically, the controller 80 does not perform the printing permission process in a case that the controller 80 determines that the sum of the specified print sheet number and the first print sheet number is less than or equal to the first upper limit, but the controller 80 performs the printing permission process in a case that the controller 80 determines that the first print sheet number is less than the first upper limit. Therefore, as a result of performing the printing permission process in a case that the first print sheet number is determined to be less than the first upper limit, the controller 80 performs the printing permission process even in a case that the sum of the specified print sheet number and the first print sheet number is greater than the first upper limit.

Further, in a case that the controller 80 determines that the print job is received, the controller 80 determines whether the second print sheet number is less than the second upper limit. In a case that the controller 80 determines that the second print sheet number is less than the second upper limit, the controller 80 performs the printing permission process. Specifically, the controller 80 does not perform the printing permission process in a case that the controller 80 determines that the sum of the specified print sheet number and the second print sheet number is less than or equal to the second upper limit, but the controller 80 performs the printing permission process in a case that the controller 80 determines that the second print sheet number is less than the second upper limit. Therefore, as a result of performing the printing permission process in a case that the second print sheet number is determined to be less than the second upper limit, the controller 80 performs the printing permission process even in a case that the sum described above is greater than the second upper imit.

The configuration described above enables the printing process to be performed based on the print job even in a case that the sum of the second print sheet number and the specified print sheet number is greater than the second upper limit when the print job is received in the above-described state.

The controller 80 performs the thirteenth determination process after the eleventh determination process. The configuration described above can disable the printing process to be performed in a case that the first print sheet number is greater than or equal to the first upper limit even in a case that the second print sheet number is less than the second upper limit.

In a case that the image forming apparatus 1 is not connected to the network 100, the controller 80 performs the second update process after the printing permission process. According to the configuration described above, the image forming apparatus 1 can update the second print sheet number information after performing the printing permission process and before receiving a print job again.

In a case that the image forming apparatus 1 is not connected to the network 100, the controller 80 performs the thirteenth determination process and the fifth notification process. According to the configuration described above, in a case that the second print sheet number is greater than or equal to the second upper limit, the image forming apparatus 1 does not perform the printing permission process. However, since the image forming apparatus 1 performs the fifth notification process, the image forming apparatus 1 can prompt the user to connect the image forming apparatus 1 to the network 100. In other words, the image forming apparatus 1 can provide the user with an opportunity to enable the image forming apparatus 1 to perform the printing permission process based on the print job.

In a case that the image forming apparatus 1 is not connected to the network 100, the controller 80 performs the eleventh determination process, the thirteenth determination process, and the fourteenth determination process. According to the configuration described above, the image forming apparatus 1 can perform different processes depending on whether the second print sheet number is less than the second warning sheet number.

In a case that the image forming apparatus 1 is not connected to the network 100, the controller 80 performs the eleventh determination process, the thirteenth determination process, the fourteenth determination process, the sixth notification process, and the printing permission process. In a case that the second print sheet number is less than the second warning sheet number, the image forming apparatus 1 can perform the printing permission process. On the other hand, in a case that the second print sheet number is greater than or equal to the second warning sheet number, the image forming apparatus 1 can notify the user that the second print sheet number is about to reach the second upper limit, in addition to performing the printing permission process.

Examples of Implementation by Software

The control blocks of the image forming apparatus 1 and the server 40 may be implemented by a logic circuit (hardware) formed with an integrated circuit (IC chip) and etc. or software.

In the latter case, each of the image forming apparatus 1 and the server 40 includes a computer executing, as software, instructions of a program that implement a corresponding function. For example, the computer includes at least one processor and a computer-readable storage medium storing the program. In the computer, the processor reads the program from the storage medium and executes the program, thereby achieving the object of the present disclosure. As the processor, the computer may use a CPU, for example. As the storage medium, the computer may use a "non-transitory tangible medium" such as a ROM (Read Only Memory), a tape, a disk, a card, a semiconductor memory, or a programmable logic circuit. The computer may also include a RAM (Random Access Memory) to develop the program therein. The program may be supplied to the computer via any transmission medium (e.g., a communication network or a broadcast wave) capable of transmitting the program. An aspect of the present disclosure may be implemented in the form of a data signal embedded in a carrier wave by which the control program is embodied according to electrical transmission.

Supplementary Information

Although each drum cartridge 20 includes the photosensitive drum 21 and each toner cartridge 30 includes the developing roller 31 in the embodiment described above, the image forming apparatus 1 is not limited to this configuration.

First Modification

In a first modification, each drum cartridge 20 may include the developing roller 31 in addition to the cartridge casing, the photosensitive drum 21, and the drum memory. In this case, the cartridge casing includes the photosensitive drum 21, the drum memory, and the developing roller 31. In this first modification, each toner cartridge 30 includes the cartridge casing and the toner memory, but does not include the developing roller 31. The cartridge casing of each toner cartridge 30 accommodates toner. The outer circumferential surface of the developing roller 31 contacts the outer circumferential surface of the photosensitive drum 21 inside the corresponding drum cartridge 20.

Second Modification

In a second modification, the image forming apparatus 1 may further include developing cartridges (not shown). Each developing cartridge includes the developing roller 31. In this case, each drum cartridge 20 includes the cartridge casing, the photosensitive drum 21, and the drum memory. Each toner cartridge 30 includes the cartridge casing and the toner memory but does not include the developing roller 31. The cartridge casing of each toner cartridge 30 accommodates toner. In this second modification, the drum cartridges 20, the toner cartridges 30, and the developing cartridges are attached to the main casing 10, whereby these three components are held together in the respective cartridge holders 13.

Third Modification

In a third modification, the image forming apparatus 1 may include cartridges (not shown) instead of including the drum cartridges 20 and the toner cartridges 30. In this case, each cartridge includes a cartridge casing, the photosensitive drum 21, a memory, and the developing roller 31. The outer circumferential surface of the developing roller 31 contacts the outer circumferential surface of the photosensitive drum 21 inside the cartridge. The cartridge casing of the cartridge accommodates toner.

The disclosure described above is not limited to the above described embodiment. Embodiments obtained by combining the technical means disclosed in the different embodiments are included in the technical scope of the present invention.

What is claimed is:

1. An image forming apparatus comprising:
    a main memory storing:
        mode information indicating whether the image forming apparatus is set to a contract mode;
        a first upper limit to which printing can be performed during a prescribed period of time set according to the contract and implemented by the image forming apparatus when set to the contract mode;
        a second upper limit to which printing can be performed during the prescribed period of time set in a case that the image forming apparatus is not connected to a network;
        a first actual print sheet number actually printed during the prescribed period of time; and
        a second actual print sheet number actually printed during the prescribed period of time in the case that the image forming apparatus is not connected to the network; and
    a controller configured to perform:
        a first printing permission process in a case that the mode information indicates the contract mode, the image forming apparatus is communicably connected to a server, and the first actual print sheet number is less than the first upper limit when the controller receives a print job even in a case that a first sum of a specific print sheet number specified in advance in the print job and the first actual print sheet number is greater than the first upper limit, the first printing permission process permitting printing for a specific sheet number as a permission print sheet number; and
        a second printing permission process in a case that the mode information indicates the contract mode, the image forming apparatus is not communicably connected to the server, and the second actual print sheet number is less than the second upper limit when the controller receives the print job even in a case that a second sum of the specific print sheet number and the second actual print sheet number is greater than the second upper limit, the second printing permission process permitting printing for the specific sheet number as the permission print sheet number.

2. The image forming apparatus according to claim 1, wherein the controller is configured to perform:
    an update process after the first printing permission process is performed in a case that the first sum is greater than the first upper limit, the update process being to update the first actual print sheet number by adding a print sheet number actually printed out of the permission print sheet number to the first actual print sheet number before the first printing permission process permits the printing.

3. The image forming apparatus according to claim 1, wherein the controller is configured to perform:
    a first notification process prompting a user to update a content of a contract for the contract mode without performing the first printing permission process in a case that the first actual print sheet number is greater than or equal to the first upper limit, when the controller receives a print job again after the first printing permission process is performed in the case that the first sum is greater than the first upper limit.

4. The image forming apparatus according to claim 1, wherein the main memory stores warning sheet number information which is set according to the contract mode, the warning sheet number information indicating a warning sheet number which is a print sheet number less than the first upper limit during the prescribed period of time and being for warning the user that the first actual print sheet number is close to the first upper limit,
    wherein the controller is configured to perform:
        a determination process to determine whether the first actual print sheet number is less than the warning sheet number.

5. The image forming apparatus according to claim 4, wherein the controller is configured to perform the first printing permission process in a case that the first actual print sheet number is less than the first upper limit and the first actual print sheet number is less than the warning sheet number,
    wherein the controller is configured to perform:

a second notification process and the first printing permission process in a case that the first actual print sheet number is less than the first upper limit and the actual sheet number is greater than or equal to the warning sheet number, the second notification process notifying the user that the first actual print sheet number is about to reach the first upper limit.

6. The image forming apparatus according to claim 1, wherein the mode information indicates whether the image forming apparatus is set to the contract mode or a normal mode different from the contract mode,
   wherein the contract mode is a mode in which at least the first upper limit information is stored in the main memory according to a contract,
   wherein the normal mode is a mode in which the first upper limit information is not stored in the main memory and the controller permits printing for the specified print sheet number without limitation as long as developer remains in a cartridge.

7. The image forming apparatus according to claim 1, wherein the controller is configured to further perform:
   prompting the image forming apparatus to connect to the network in a case that the mode information indicates the contract mode, the image forming apparatus is not communicably connected to the server, and the second actual print sheet number is not less than the second upper limit when the controller receives the print job.

8. A printing permission method executed by an image forming apparatus, the image forming apparatus including a main memory storing:
   mode information indicating whether the image forming apparatus is set to a contract mode;
   a first upper limit to which printing can be performed during a prescribed period of time set according to the contract and implemented by the image forming apparatus when set to the contract mode;
   a second upper limit to which printing can be performed during the prescribed period of time set in a case that the image forming apparatus is not connected to a network;
   a first actual print sheet number actually printed during the prescribed period of time; and
   a second actual print sheet number actually printed during the prescribed period of time in the case that the image forming apparatus is not connected to the network,
the printing permission method comprising:
   a first printing permission process in a case that the mode information indicates the contract mode, the image forming apparatus is communicably connected to a server, and the first actual print sheet number is less than the first upper limit when a print job specifying a specific print sheet number is received, the first printing permission process permitting printing for the specific sheet number as a permission print sheet number even in a case that a first sum of a specific print sheet number and the first actual print sheet number is greater than the first upper limit; and
   a second printing permission process in a case that the mode information indicates the contract mode, the image forming apparatus is not communicably connected to the server, and the second actual print sheet number is less than the second upper limit when the controller receives the print job even in a case that a second sum of the specific print sheet number and the second actual print sheet number is greater than the second upper limit, the second printing permission process permitting printing for the specific sheet number as the permission print sheet number.

9. The method according to claim 8, further comprising:
   prompting the image forming apparatus to connect to the network in a case that the mode information indicates the contract mode, the image forming apparatus is not communicably connected to the server, and the second actual print sheet number is not less than the second upper limit when the print job is received.

* * * * *